Oct. 4, 1966          D. L. FUNCK          3,276,900

FOAM COATED PAPER SUBSTRATE AND PROCESS OF MAKING SAME

Filed July 23, 1962

INVENTOR
DENNIS LIGHT FUNCK

BY    *Frank C. Hilberg Jr.*

ATTORNEY

3,276,900
FOAM COATED PAPER SUBSTRATE AND PROCESS OF MAKING SAME

Dennis Light Funck, Wilmington, Del., assignor to E. I. du Pont de Nemours and Company, Wilmington, Del., a corporation of Delaware
Filed July 23, 1962, Ser. No. 211,697
4 Claims. (Cl. 117—93.1)

This invention relates to the production of thin thermoplastic foams on dielectric substrates.

In the past it has been well known that foams of many thermoplastic resins could be produced. However, it has heretofore been impossible to produce thin foamed sections.

It is an object of this invention to produce such a thin foamed section on the surface of a dielectric substrate.

This and other objects are accomplished by subjecting a dielectric substrate coated with a thermoplastic resin to rapid dielectric heating.

Thermoplastic films, such as polyethylene films, do not heat when passed through a dielectric heater, because they absorb an insufficient amount of the electric current to effect appreciable heating. The substrate suitable for use in this invention absorb sufficient electric current from the dielectric to heat rapidly. In the case of cellulose as a substrate, uncoated cellulose will degrade or burn within a few seconds in a typical dielectric oven or heater. However, a cellulose substrate coated with a thermoplastic resin such as polyethylene will not degrade or burn in such a dielectric oven or heater in less than several minutes. It appears that the thermoplastic resin coating while not absorbing the dielectric current absorbs the heat from the substrate and is thereby heated and at the same time reduces the heating effect on the substrate in as much as the final temperature reached is reduced.

The requisite properties of the materials used in this invention are as follows: The coating is a thermoplastic having a softening point below the temperature at which the substrate degrades, and yet is not soft at room temperature. This requirement as a practical matter means that the softening point of the thermoplastic coating is above 40° C. and below about 180° C. when using a cellulose substrate.

There also is present in the thermoplastic resin coating composition sufficient volatiles or volatile forming compounds to produce greater than $2 \times 10^{-5}$ moles of gas per cc. of thermoplastic resin. The volatile or volatile-forming compound may be either a low molecular weight hydrocarbon or other volatile compounds such as water or a chemical blowing agent which breaks down on heating to form a volatile component such as carbon dioxide, nitrogen, or water. Absorbed moisture from the atmosphere or remaining monomer naturally occurring in the thermoplastic coating may be sufficient so that no special volatile compound or foaming agent need be added to the composition.

The substrate is a dielectric and when coated as in this invention does not degrade or decompose when exposed to a temperature of 200° C. for one minute. With the thin films of this invention, the foaming takes place within one minute. If extended periods of time are used, the volatile merely evaporates from the thermoplastic coating and little or no foaming takes place.

The thermoplastic coatings of this invention are from 0.5 to 5 mils thick prior to foaming and about 1.5 to 30 mils thick after foaming. The increase in thickness of the foamed thermoplastic is from 1.5 to 10 times the thickness of the unfoamed thermoplastic coating. This increase is known as the expansion factor. The final foamed coatings are generally about two bubbles thick. The thermoplastic surfacings used in this invention may be applied to the substrate by any convenient conventional means such as extrusion coating, lamination, spray coating, dispersion coating or dip coating.

The amount of heat absorbed by a sample in a dielectric oven is governed by the following formula wherein the power is expressed in watts.

$$\text{Power} = 1.41 E^2 f K D (A/t) \times 10^{-2}$$

wherein E is the voltage impressed across the sample, $f$ is the frequency in cycles per second, K is the dielectric constant of the sample, D is the dissipation factor of the sample, A is the area of the sample exposed to the dielectric current in square inches and $t$ is the thickness of the sample in inches. The dielectric substrates used in this invention have dielectric constants K, of greater than 2.2 and dissipation factors of greater than 0.001. Definitions of K and D are found in ASTM D–150. $K = C/C_v$ where the units for C and $C_v$ are farad/m. The thermoplastic coatings used in this invention have dielectric constants K and dissipation factors below those of the substrate so as to enable the coating to act as a heat sink. Further information concerning dielectric heating may be found in "Induction" and "Dielectric Heating" by J. W. Cable, Reinhold Publishing Corp., New York, 1954.

The heating effect (power absorbed) is due to the polar groups within the molecules attempting to orientate themselves with the electrical field. Since the field is reversed millions of times a second, such as 140 megacycles per second, a considerable amount of electrical energy is converted into heat by the motion of the molecules. In general, the dielectric field is of at least 25,000 volts and be above 100 megacycles per second frequency. As can be seen from the equation the more polar the material the greater is the power absorbed, since the higher the loss factor the more polar is the material. However, it should be pointed out that the larger the air gap between the electrodes, the higher the voltage needed to impress the same potential across the sample.

In dielectric heating the interior of the material becomes hotter than the surfaces. This is in contrast to other types of heating where the surfaces are hotter than the interior. In dielectric heating all portions of a given material being heated absorb energy at the same rate. Since heat is lost from the surfaces to the atmosphere or the electrodes the surfaces are cooler than the interior. In this way, much of the foaming is accomplished in the interior of the structure and very little of the volatiles creating the foam evaporate compared with conventional heating of such coated substrates. Furthermore, the foams of this invention have a substantially continuous crust or outer film of thermoplastic resin.

Figure 1:
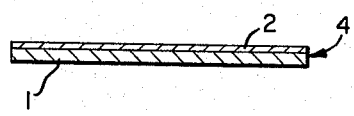
FIG. 1 shows a cross-section of a resin coated paper.
Figure 2:
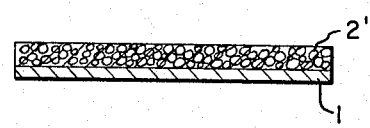
FIG. 2 shows a cross-section of the same resin coated paper as FIG. 1 after the resin has been foamed in accordance with this invention.

In FIG. 1 a substrate 1 is shown with a coating 2. The substrate as above discussed is preferably paper and the coating is preferably a polyolefin such as polyethylene, polypropylene or blends thereof. In FIG. 2 the same substrate 1 is shown but the coating 2 has been foamed by dielectric heating. As can be seen from FIG. 2 the coating is preferably about 1 to 2 bubbles thick.

Figure 3:
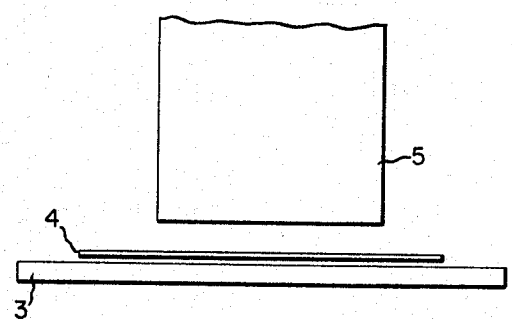
FIG. 3 shows a pair of electrodes arranged to foam a resin coated substrate.

FIG. 3 shows ground electrode 3, which for example measures 6 inches square and ½ inch thick, supporting the coated substrate 4 prior to heating with the resin coating 2 facing upwards. High voltage electrode 5 is located above the coated substrate 4 leaving an air gap. The electrode may be of almost any size.

Figure 4:
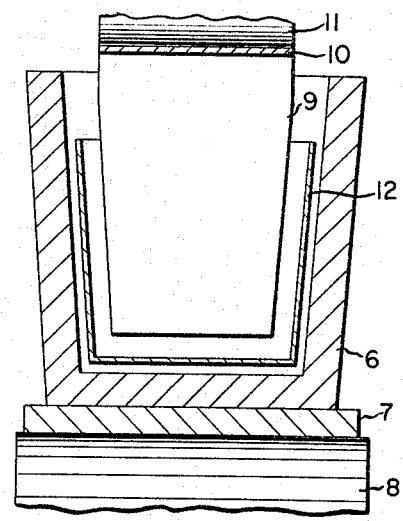
FIG. 4 shows an apparatus for continuously foaming resin coated cups.

In FIG. 4 a ground electrode 6 is shown mounted on a conveyor belt 7 which in turn contacts roll 8 which supplies the belt with electrical contact. High voltage electrode 9 is also mounted on a belt 10 in contact with roll 11 which supplies the high voltage to electrode 9. The speed of the belts and length of their close parallel run determine the period of residence of thermoplastic resin coated paper cup 12 within the dielectric field.

The present invention involves the realization that a thermoplastic resin, such as polyethylene, when coated on a substrate, such as paper acts as a heat sink when the structure is placed in a dielectric oven, and absorbs the heat generated in the paper by the dielectric oven, thereby enabling the structure to withstand several times the amount of dielectric current or an equivalent amount of dielectric current for a much longer period of time than could an uncoated tray or container made of a material such as paper.

Figure 5:
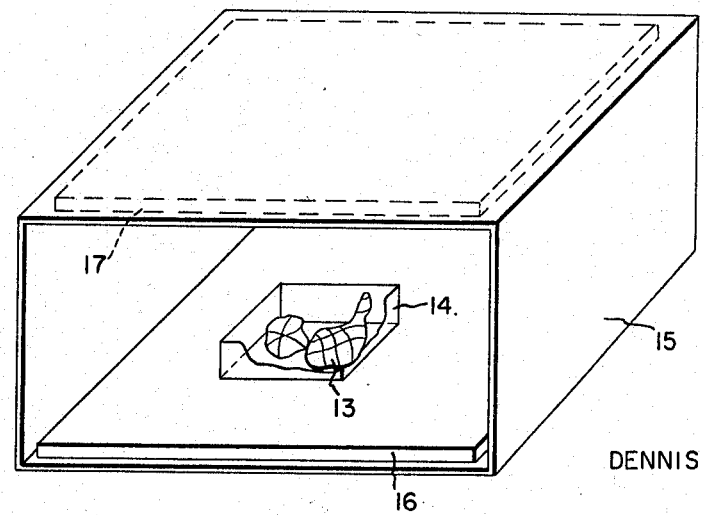
FIG. 5 shows a dielectric oven using a resin coated container for the food being cooked in the oven.

Dielectric ovens are commonly used in certain types of restaurants or cafeterias, particularly those which have automatic coin operated ovens in which frozen food in a tray or container is fed into the oven upon insertion of a coin and the oven is automatically turned on. In the past it has been necessary to use heat resistant plastics, metals, or ceramics to fabricate the food container for use in this type of oven, since paper containers would burn, char or ignite before the food was cooked. FIG. 5 illustrates the cooking of food 13, in this case a 20 gram sample of frozen chicken in a 10-mil thick paper tray 14 coated with 3 mil polyethylene, in a dielectric oven 15 having ground electrode 16, and spaced 1¹³⁄₁₆ inches above a high voltage electrode 17, and a front opening which can if desired, be supplied with a door not shown. For example, the oven was operated at 25 kilovolts at 100 megacycles for 45 seconds. The tray as above described was uninjured and transferred no taste to the chicken breasts contained therein. The food is heated much more rapidly than the polyethylene coated paper container because the food has a higher dielectric constant K than either paper or conventional thermoplastic resins. The dielectric constants of most foods and especially frozen foods are slightly below 78; the dielectric constant of water compared with the dielectric constant of polyethylene is 2.25. The higher dielectric constants of the food indicate that the food will absorb several times the heat that the container will absorb per unit of thickness and therefore will heat more than the container. Furthermore, the resin if somewhat overheated, will foam and thereby expend heat. After foaming the resin will insulate the paper portion of the container from the hot food and prevent charring of the paper. Generally, dielectric ovens cook food in from .2 to 6 minutes so that the resin coated substrates of this invention can withstand the heat generated. These food cooking ovens normally operate at from 300 watts to 5 kw. and from 1,000 to 5,000 megacycles as is set forth on page 484 of Cable, referred to above.

Examples 1–24 set forth in Table I are illustrative of the invention. In Table I, E/MAA-H represents a free radical catalyzed copolymer of ethylene and methacrylic acid containing 10 wt. percent of methacrylic acid which copolymer has been treated with 6 wt. percent of hexamethylene diamine; E/MAAS represents a free radical catalyzed copolymer of ethylene and methacrylic acid containing 10 wt. percent of methacrylic acid which copolymer has been treated with 3 wt. percent of sodium hydroxide; E/VAC represents a copolymer of ethylene and vinyl acetate containing 9 wt. percent of vinyl acetate; and PMM represents polymethyl methacrylate.

TABLE I

| Ex. | Substrate | Coating | | | Coating Additives | |
| --- | --- | --- | --- | --- | --- | --- |
| | | Polymer | Density, g./cc. | Melt Index, g./10 min. | Weight Percent Based on Polymer | Additives |
| 1 | Kraft Paper | Polyethylene | 0.915 | 1.9 | | |
| 2 | do | do | 0.915 | 1.9 | | |
| 3 | do | do | 0.915 | 1.9 | | |
| 4 | do | do | 0.915 | 1.9 | 2 | p,p'oxybis (benzene sulfonyl semicarbazide). |
| 5 | do | do | 0.915 | 1.9 | 5 | Azodicarbonamide. |
| 6 | do | do | 0.915 | 1.9 | 5 | Do. |
| 7 | do | do | 0.915 | 1.9 | 5 | Do. |
| 8 | do | do | 0.915 | 1.9 | 10 | $CaSO_4 \cdot 2H_2O$. |
| 9 | do | do | 0.915 | 1.9 | 10 | $Na_2B_4O_7 \cdot 10H_2O$. |
| 10 | do | do | 0.915 | 1.9 | 10 | $MgCO_3$. |
| 11 | do | do | 0.923 | 3.7 | 2 | p,p'oxybis (benzene sulfonyl semicarbazide). |
| 12 | do | do | 0.923 | 3.7 | 2 | $CaSO_4 \cdot 2H_2O$. |
| 13 | do | do | 0.923 | 3.7 | 2 | $Na_2B_4O_7 \cdot 10H_2O$. |
| 14 | do | E/MAA-H | | | | |
| 15 | do | E/MAA-H | | | 2 | Azodicarbonamide. |
| 16 | do | E/MAA-H | | | 2 | Do. |
| 17 | do | E/MAA-H | | | 2 | Do. |
| 18 | do | E/MAA-H | | | 2 | Do. |
| 19 | do | E/MAA-H | | | 2 | Do. |
| 20 | do | E/MAA-H | | | 2 | Do. |
| 21 | do | E/MAA-H | | | 2 | Do. |
| 22 | do | E/MAAS | | | 2 | Do. |
| 23 | do | E/VAC | | | 2.5 | Do. |
| 24 | Polyhexamethylene adipamide. | PMM | | | | |

TABLE I—Continued

| Ex. | Sample Dimensions | | | Operating Conditions | | | Sample Thickness After Treatment | | Expansion Ratio |
|---|---|---|---|---|---|---|---|---|---|
| | Diameter, inches | Thickness | | Electrode Spacing, inches | Estimated Power Voltage Stat, Kv., Setting | Time, sec. | Total, mils | Coating, mils | |
| | | Substrate, mils | Coating, mils | | | | | | |
| 1 | 4 | 5.3 | 1.6 | 5/8 | 40 | 60 | 9.6 | 4.3 | 2.7 |
| 2 | 4 | 5.3 | 1.6 | 5/8 | 42 | 16.5 | 11.0 | 5.7 | 3.5 |
| 3 | 4 | 5.3 | 0.5 | 5/8 | 42 | 29 | 6.5 | 1.2 | 2.4 |
| 4 | 4 | 5.1 | 1.6 | 5/8 | 40 | 35 | 8.4 | 3.3 | 2.1 |
| 5 | 4 | 5.4 | 1.6 | 5/8 | 40 | 40 | 8.0 | 2.6 | 1.6 |
| 6 | 4 | 5.3 | 1.0 | 5/8 | 42 | 22 | 9.3 | 4.0 | 4.0 |
| 7 | 4 | 5.3 | 2.5 | 5/8 | 42 | 29 | 12.0 | 6.7 | 2.7 |
| 8 | 4 | 5.4 | 1.3 | 5/8 | 40 | 45 | 7.6 | 2.2 | 1.7 |
| 9 | 4 | 5.2 | 1.0 | 5/8 | 40 | 31 | 7.2 | 2.0 | 2.0 |
| 10 | 4 | 5.3 | 1.5 | 5/8 | 40 | 34 | 7.7 | 2.4 | 1.6 |
| 11 | 4 | 5.3 | 0.5 | 5/8 | 42 | 17 | 9.0 | 3.7 | 7.4 |
| 12 | 4 | 5.3 | 1.3 | 5/8 | 40 | 30 | 9.2 | 3.9 | 3.0 |
| 13 | 4 | 5.3 | 1.0 | 5/8 | 40 | 45 | 7.4 | 2.1 | 2.1 |
| 14 | 4 | 5.1 | 1.9 | 5/8 | 40 | 21 | 8.4 | 3.3 | 1.7 |
| 15 | 1 1/8 | 5.5 | 0.6 | 0.39 | 30 | 30 | 10.8 | 5.3 | 8.8 |
| 16 | 1 1/8 | 5.0 | 5.1 | 0.51 | 40 | 15 | 27 | 22 | 4.3 |
| 17 | 4 | 5.3 | 2.2 | 5/8 | 40 | 7 | 10.2 | 4.9 | 2.2 |
| 18 | 4 | 5.3 | 2.7 | 5/8 | 40 | 8 | 10.4 | 5.1 | 1.9 |
| 19 | 4 | 5.3 | 1.1 | 5/8 | 40 | 21 | 10.2 | 4.9 | 4.5 |
| 20 | 4 | 5.3 | 0.5 | 5/8 | 40 | 21 | 9.0 | 3.7 | 7.4 |
| 21 | 4 | 6 | [1] 1.5 | 5/8 | 45 | 10 | 14 | 8 | 2.7 |
| 22 | 1 1/8 | 6.3 | 1.8 | 0.51 | 37 | 60 | 9.1 | 2.8 | 1.6 |
| 23 | 1 1/8 | 6.5 | 1.1 | 0.51 | 40 | 30 | 8.4 | 1.9 | 1.7 |
| 24 | 4 | 6 | 5 | 5/8 | 45 | 16.5 | 50 | 44 | 8.8 |

[1] Each side.

The coated substrate foamed in accordance with this invention have high tensile strengths as shown in Table II.

TABLE II

| Sample | Thickness (mils) | Density of Coating (g./cc.) | Tensile Strength (p.s.i.) |
|---|---|---|---|
| Kraft Paper | 5.3 | | 4,220 |
| Polyethylene Coated Kraft Paper | 7.4 | 0.92 | 5,500 |
| Foam Coated Paper of Ex. 17 | 10.2 | 0.39 | 4,380 |
| Foam Coated Paper of Ex. 18 | 10.4 | 0.38 | 4,760 |

This invention is especially useful in foaming thermoplastic resin coatings on paper cups as illustrated in FIG. 4. The foam coated cups are well suited for use in serving hot liquids such as coffee because of the insulating properties of the foam. Furthermore, the foam coated cups do not stick together as much as unfoamed coated cups do when the cups are stacked together.

*Example 25*

A tray formed of 10-mil thick paper coated with a 3-mil thick film of polyethylene having a density of .93 g./cc., was used to hold a piece of frozen chicken which was then placed in a dielectric oven as illustrated in FIG. 5, operating at 50 kv. and 180 megacycles with the electrodes spaced 2 inches apart. The chicken was cooked in 20 seconds while the tray remained undamaged with no foaming of the polyethylene. The experiment was repeated using up to 45 seconds cooking time with no damage to the tray.

I claim:

1. An article of manufacture comprising a paper substrate from 2 to 40 mils thick and intimately adhered to said paper a surfacing from 1.5 to 30 mils thick consisting essentially of a thermoplastic resin selected from the class consisting of polyethylene and polypropylene foam having a continuous outer surface of said thermoplastic resin, and having an expansion factor of from 1.5 to 10, which thermoplastic resin has a softening point between 40° C. and 180° C.

2. The article of claim 1 wherein the thermoplastic resin is polyethylene.

3. A process of forming an article having a continuous outer surface of thermoplastic resin comprising the step of subjecting a paper substrate surfaced with a layer from 0.5 to 5 mils consisting essentially of a thermoplastic resin, selected from the class consisting of polyethylene and polypropylene, to a dielectric field of at least 25,000 volts and above 100 megacycles per second frequency for from 0.5 to 60 seconds, which thermoplastic resin contains a quantity of a compound selected from the class consisting of volatile compounds and volatile-forming compounds sufficient to produce upon heating greater than $2 \times 10^{-5}$ mole of gas per cc. of thermoplastic resin and which paper substrate has a dielectric constant of at least 2.2 and a dissipation factor of at least 0.001 and which does not degrade in less than 60 seconds at 200° C. to thereby foam the resin to an expansion factor of from 1.5 to 10.

4. The process of claim 3 wherein the thermoplastic resin is polyethylene.

References Cited by the Examiner

UNITED STATES PATENTS

| | | | |
|---|---|---|---|
| 2,495,435 | 1/1950 | Welch | 219—10.4 X |
| 2,586,887 | 2/1952 | Van Gaver | 260—2.5 |
| 2,775,570 | 12/1956 | Barkdoll | 117—155 X |
| 2,779,847 | 1/1957 | Bosomworth | 219—10.41 |
| 2,841,506 | 7/1958 | Rueckert | 117—155 X |
| 2,894,855 | 7/1959 | Wilhelm et al. | 117—161 X |
| 2,896,054 | 7/1959 | Pircon | 219—10.41 |
| 2,929,793 | 3/1960 | Hirsh | 260—2.5 |
| 2,979,246 | 4/1961 | Liebeskind. | |
| 2,998,501 | 8/1961 | Edberg et al. | 156—79 X |
| 3,072,972 | 1/1963 | Yokose et al. | 260—2.5 X |
| 3,095,315 | 6/1963 | Magill et al. | 117—98 X |
| 3,098,831 | 7/1963 | Carr | 260—2.5 |

WILLIAM D. MARTIN, *Primary Examiner.*

RICHARD D. NEVIUS, *Examiner.*

C. A. HAASE, T. G. DAVIS, *Assistant Examiners.*